(12) United States Patent
Purdy et al.

(10) Patent No.: US 8,808,851 B2
(45) Date of Patent: Aug. 19, 2014

(54) MULTI-LAYERED COMPOSITE CRYSTALLINE COLLOIDAL ARRAY FILMS

(75) Inventors: Sean Purdy, Cincinnati, OH (US); Michael A. Zalich, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1399 days.

(21) Appl. No.: 12/142,880

(22) Filed: Jun. 20, 2008

(65) Prior Publication Data

US 2009/0317623 A1 Dec. 24, 2009

(51) Int. Cl.
- *B32B 5/16* (2006.01)
- *B32B 27/38* (2006.01)
- *B32B 27/36* (2006.01)
- *B32B 15/00* (2006.01)
- *B32B 27/06* (2006.01)

(52) U.S. Cl.
USPC ........ 428/327; 428/413; 428/423.1; 428/480; 428/523; 524/430

(58) Field of Classification Search
None
See application file for complete search history.

(56) References Cited

U.S. PATENT DOCUMENTS

| | | |
|---|---|---|
| 5,122,905 A | 6/1992 | Wheatley et al. |
| 5,281,370 A | 1/1994 | Asher et al. |
| 5,527,386 A | 6/1996 | Statz |
| 5,624,731 A | 4/1997 | Desjardins |
| 5,711,884 A | 1/1998 | Asher et al. |
| 5,783,120 A | 7/1998 | Ouderkirk et al. |
| 5,824,733 A | 10/1998 | Dobert et al. |
| 5,932,309 A | 8/1999 | Smith et al. |
| 6,287,992 B1 | 9/2001 | Polansky et al. |
| 6,299,979 B1 | 10/2001 | Neubauer et al. |
| 6,337,131 B1 | 1/2002 | Rupaner et al. |
| 6,894,086 B2 | 5/2005 | Munro et al. |
| 2005/0111807 A1* | 5/2005 | Hino ............................ 385/129 |
| 2007/0100026 A1 | 5/2007 | Munro et al. |
| 2007/0165903 A1 | 7/2007 | Munro et al. |
| 2008/0146716 A1* | 6/2008 | Zalich et al. .................. 524/430 |

FOREIGN PATENT DOCUMENTS

| | | |
|---|---|---|
| EP | 0955323 A1 | 11/1999 |
| RU | 2237689 C2 | 10/2004 |
| WO | WO 2008/016606 A2 | 2/2008 |

OTHER PUBLICATIONS

Pfaff et al., "Angle-Dependent Optical Effects Deriving from Submicron Structures of Films and Pigments", Chem. Rev. 1999, 99, 1963-1981.

* cited by examiner

*Primary Examiner* — Alicia Chevalier
*Assistant Examiner* — Alexandre Ferre
(74) *Attorney, Agent, or Firm* — Julie W. Meder

(57) ABSTRACT

A multi-layered composite material is disclosed, which includes an ordered periodic array of particles held in a matrix composition. The composite material further includes inorganic nanosized particles infused into the array of particles.

18 Claims, 2 Drawing Sheets

MULTI-LAYERED COMPOSITE CRYSTALLINE COLLOIDAL ARRAY FILMS

STATEMENT REGARDING FEDERALLY SPONSORED RESEARCH

The invention was made with government support under contract FA8650-05-2-5042 awarded by the AFRL. The government may have certain rights in the invention.

FIELD OF THE INVENTION

This invention relates to radiation diffractive film materials, more particularly to periodic arrays of particles held in a matrix composition with alternating layers of different particles.

BACKGROUND OF THE INVENTION

Radiation diffractive materials based on crystalline colloidal arrays have been used for a variety of purposes. A crystalline colloidal array (CCA) is a three-dimensional ordered array of mono-dispersed colloidal particles. The particles are typically composed of a polymer, such as polystyrene. These colloidal dispersions of particles can self-assemble into ordered arrays (crystalline structures) having lattice spacings that are comparable to the wavelength of ultraviolet, visible or infrared radiation. The crystalline structures have been used for filtering narrow bands of selective wavelengths from a broad spectrum of incident radiation, while permitting the transmission of adjacent wavelengths of radiation. Alternatively, CCAs are fabricated to diffract radiation for use as colorants, markers, optical switches, optical limiters and sensors. Many of these devices have been created by dispersing particles in a liquid medium, whereby the particles self-assemble into an ordered array. The positions of the particles in the array may be fixed by mutual polymerization of the particles or by introducing a solvent that swells and locks the particles together.

Other CCAs are produced from a dispersion of similarly charged mono-dispersed particles in a carrier. The dispersion is applied to a substrate, and the carrier is evaporated to yield an ordered periodic array of particles. The array is fixed in place by coating the array with a curable polymer, such as an acrylic polymer, polyurethane, alkyd polymer, polyester, siloxane-contained polymer, polysulfide or epoxy-containing polymer. Methods for producing such CCAs are disclosed in U.S. Pat. No. 6,894,086, incorporated herein by reference. Alternatively, the particles may have a core-shell structure where the core is produced from materials such as those described above for unitary particles and the shell is produced from the same polymers as the core material with the polymer of the particle shell different from the core material for a particular array of the core-shell particles. Such core-shell particles and methods of their production are disclosed for example in U.S. Patent Application Publication No. 2007/0100026, incorporated herein by reference.

In these arrays of unitary particles or core-shell particles, the structures diffract radiation according to Bragg's law, wherein the radiation meeting the Bragg conditions is reflected while adjacent spectral regions that do not meet the Bragg conditions are transmitted through the device. While the wavelength of reflected radiation is in part determined by the effective refractive index of the array, the intensity of the reflective radiation is also proportional to the difference in refractive index between the particles in the array and the surrounding matrix.

SUMMARY OF THE INVENTION

The present invention relates to multi-layered composite material that includes alternating layers of first particles and second particles, wherein the first particles are arranged in an ordered periodic array and held in a matrix composition and the second particles are received within the array or the matrix composition or both. Also included is a multi-layered composite material that includes an ordered periodic array of composite particles held in a matrix composition, where the composite particles include a polymeric organic portion and an inorganic portion. The present invention also includes a method of producing multi-layered composite material that includes providing a major component comprising a periodic array of organic polymer particles held in a matrix and forming inorganic particles in situ in the major component. In this manner, the present invention further includes a composite material that includes a first component comprising an ordered array of organic polymer particles held in a matrix composition and a second component comprising an inorganic particulate phase infused into the first component.

DETAILED DESCRIPTION OF THE INVENTION

Figure 1:
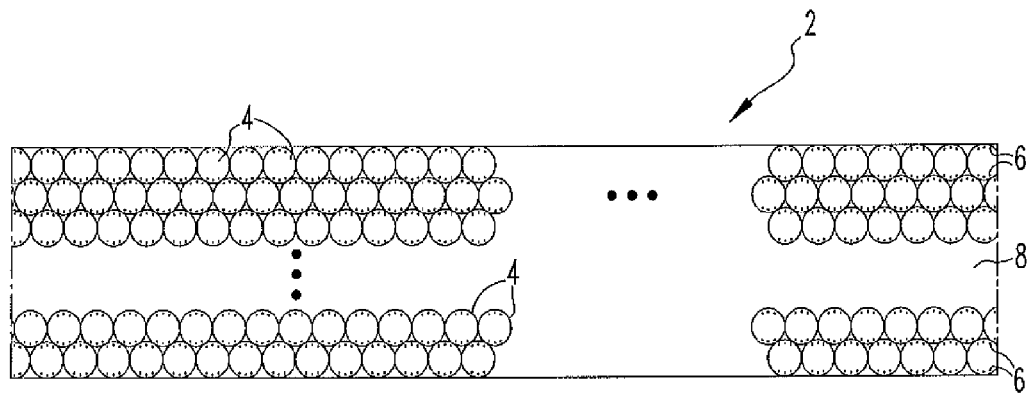
FIG. 1 is a schematic cross-section of radiation diffraction material of the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is meant to include homopolymer, copolymer and oligomer. The term "metal" includes metals, metal oxides, and metalloids. The term "infuse" and related terms (such as infusion) refer to penetration from a liquid phase.

The present invention includes multi-layered composite material, where the material diffracts radiation in the visible and/or non-visible spectrum and methods for making the same. As used herein, "composite" refers to a feature of being composed of disparate or distinct parts or components. The composite material includes an ordered periodic array of diffracting regions located in a polymeric matrix. By diffracting regions, it is meant regions having a refractive index that differs from the refractive index of the surrounding matrix including, but not limited to, composite particles and discrete particles. The array includes a plurality of layers of the diffracting regions and satisfies Bragg's law of:

$$m\lambda = 2nd \sin \theta$$

where m is an integer, n is the effective refractive index of the array, d is the distance between the layers of diffracting regions, and λ is the wavelength of radiation reflected from a plane of a layer of the diffracting regions at angle θ. As used herein, "a" wavelength of diffracted radiation includes a band of the electromagnetic radiation spectrum around that wavelength. For example, reference to a wavelength of 600 nm may include 595 to 605 nm. The reflected radiation may be in the visible spectrum or invisible spectrum (infrared or ultraviolet radiation).

Figure 2:
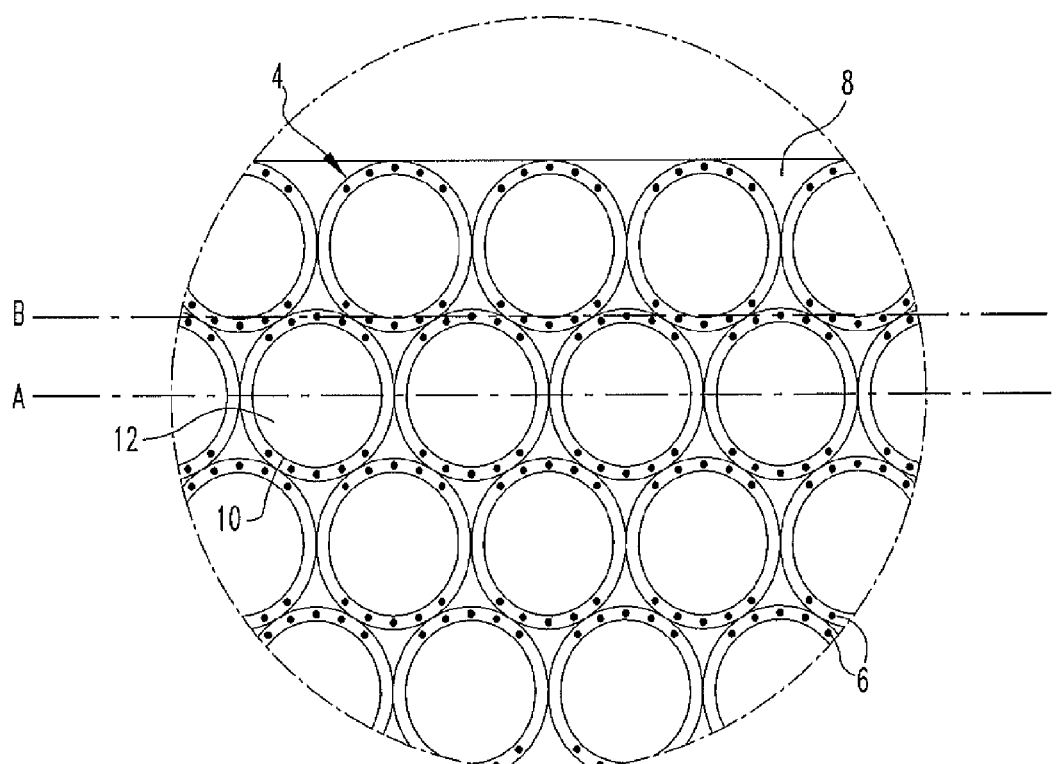
FIG. 2 is a detailed view of the schematic of FIG. 1.

The composite material generally includes a major (or first) organic component comprising a periodic array of organic particles, held in an organic matrix and a minor (or second) component comprising inorganic particles. Referring to FIGS. 1 and 2, the major component and minor component are generally arranged as alternating layers of a layer A containing first particles 4 and a layer B containing second particles 6. The first particles 4 comprise an organic polymer, and the second particles 6 are inorganic particles, typically nano-sized as described below. In one embodiment of the invention, the first particles 4 have a core-shell structure composed of a shell 10 surrounding a core 12, with the second particles 6 infused into the shells 10. The first and second particles 4, 6 are generally arranged in respective, alternating layers A and B, only one of each such layer being labeled in FIG. 2. It should be appreciated that the layers A generally refer to the regions or planes in or adjacent to the centerlines of the first particles 4 and the layers B generally refer to the regions or planes in which the second particles 6 are positioned. Typically, layers A include the first particles 4 and surrounding matrix 8 with little or none of the second particles 6. Accordingly, layers B generally include the second particles 6 and surrounding matrix 8 as well as portions of the first particles 4. The concentration of second particles 6 in layers B is variable and is related to the amount of infusion of the second particles 6 into or adjacent to the first particles 4 as described below.

In another embodiment of the invention (not shown), the first particles have a unitary structure (not a core-shell structure). As used herein, "unitary structure" refers to a feature of the particles each having a generally uniform structure without component structures, although the composition thereof may vary through the unitary particles, such as may occur upon diffusion of solvent or matrix therein. The second particles may be infused into regions of the matrix at opposing sides of the unitary first particles, thereby also exhibiting generally alternating layers of layers A containing the unitary first particles with surrounding matrix and little or none of the second particles and layers containing second particles received in the matrix, optionally also including portions of the unitary first particles.

First Particles

Various compositions may be used for the first particles, including, but not limited to, organic polymers such as polystyrene, polyurethane, acrylic polymers, alkyd polymers, polyesters, siloxane-containing polymers, polysulfides, epoxy-containing polymers and inorganic materials such as metal oxides (e.g., alumina, silica, zinc oxide, or titanium dioxide) or semi-conductors such as cadmium sulfide. The first particles may have a core-shell structure, with the polymer of the particle shell generally differing from the core material. The core material and the shell material may have different indices of refraction. In addition, the refractive index of the shell may vary as a function of the shell thickness in the form of a gradient of refractive index through the shell thickness.

The shell material may be non-film-forming, whereby the shell material remains in position surrounding each particle core without forming a film of the shell material so that the core-shell particles remain as discrete particles within the polymeric matrix and the second particles are infused into the shells. Alternatively, the shell material may be film-forming such that the shells of the core-shell particles form a film and function as a matrix material surrounding the remaining cores.

For first particles that are generally spherical, prior to infusion of the second particles, the diameter of the core may constitute 85 to 95% of the total particle diameter or 90% of the total particle diameter with the shell constituting the balance of the particle diameter and having a radial thickness dimension.

In one embodiment, the cores of the first particles are produced via emulsion polymerization of core-precursor monomers in the presence of a surfactant, yielding a dispersion of the cores. Suitable surfactants for dispersion of organic polymer particles include, but are not limited to, sodium styrene sulfonate, sodium 1-allyloxy-2-hydroxypropyl sulfonate (commercially available as Sipomer COPS-I from Rhodia Corporation), acrylamide propyl sulfonate, and sodium allyl sulfonate. Particularly useful surfactants are those that are minimally soluble in the dispersing fluid (e.g., water) of the particle dispersion. Shell monomers are added to the core particle dispersion, along with a surfactant (as described above), such that the shell monomers polymerize onto the core particles. The core-shell particles are purified from the dispersion by techniques such as ultra-filtration, dialysis or ion-exchange to remove undesired materials, such as unreacted monomer, small polymers, water, initiator, surfactant, unbound salt and grit (agglomerated particles) to produce a monodispersion of charged core-shell particles. Ultra-filtration is particularly suitable for purifying charged particles. When the particles are in dispersion with other materials, such as salts or by-products, the repelling forces of the charged particles can be mitigated; therefore, the particle dispersion is purified to essentially contain only the charged particles, which then readily repel each other and form an ordered array on a substrate as described below.

In another embodiment of the invention, unitary-structured first particles are produced by dispersing monomers with initiators in solution to produce unitary particles as described above with regard to preparing the cores of core-shell particles. A dispersion of the unitary first particles is purified as described above to produce a dispersion of only the charged unitary particles, which then form an ordered array on a substrate as described below.

Array of First Particles

Upon removal of the excess raw material, by-products, solvent and the like, electrostatic repulsion of the charged first particles causes the first particles to self-assemble into an ordered array. The purified dispersion of first particles is applied to a substrate and dried. The dispersion of first particles applied to the substrate may contain 10-70 vol. % of charged particles or 30-65 vol. % of charged particles. The dispersion can be applied to the substrate by dipping, spraying, brushing, roll-coating, curtain coating, flow-coating or die-coating to a desired thickness. The wet coating may have a thickness of 4-50 microns, such as 40 microns. Upon drying, the material contains essentially only the particles that have self-assembled in a Bragg array and diffract radiation accordingly.

Matrix

The dried array of first particles (core-shell or unitary) on a substrate is fixed in a matrix by coating the array of first particles with a fluid curable matrix composition that includes monomers or other polymer precursor materials, as disclosed in U.S. Pat. No. 6,894,086 (incorporated herein by reference) to interpenetrate the array of first particles with the curable matrix composition. The curable matrix composition material may be coated onto the dried array of particles via dipping, spraying, brushing, roll-coating, gravure coating, curtain coating, flow coating, slot-die coating, or ink-jet coating. By coating, it is meant that the curable matrix composition covers at least substantially the entirety of the array and at least in part fills the interstitial spaces between the first particles.

The matrix material may be an organic polymer such as polystyrene, polyurethane, acrylic polymers, alkyd polymers, polyester, siloxane-containing polymers, epoxy-containing polymers and/or polymers derived from an epoxy-containing polymer. In one embodiment, the matrix material is a water-soluble or hydrophilic acrylic polymer. Suitable monomers for producing a water soluble or hydrophilic matrix include, but are not limited to; ethoxylated trimethylolpropane triacrylate, polyethylene glycol, (600) diacrylate, polyethylene glycol, (400) diacrylate, polyethylene glycol, (200) diacrylate and acrylic acid, followed by curing of the matrix composition to yield an organic matrix. Other suitable monomers for producing a water soluble or hydrophilic polymer matrix may include polyethylene glycol (1000) diacrylate, methoxy polyethylene glycol (350) monoacrylate, methoxy polyethylene glycol (350) monomethacrylate, methoxy polyethylene glycol (550) monomethacrylate, methoxy polyethylene glycol (550) monoacrylate, ethoxylated$_{30}$ bisphenol A diacrylate, 2-(2-ethoxyethoxy) ethyl acrylate, acrylamide, hydroxyethyl acrylate, hydroxypropyl acrylate, polyethylene glycol (600) dimethacrylate, polyethylene glycol (400) dimethacrylate, ethoxylated$_{30}$ bisphenol A dimethacrylate, hydroxyethyl methacrylate, and hydroxypropyl methacrylate.

As detailed below, the array of first particles received in a matrix may be produced on a substrate that functions as a temporary support or on a substrate that is a desired end-use for the composite material. By temporary support, it is meant that the substrate is used to support production of the composite material of the present invention, which is subsequently removed therefrom in self-supporting form such as, for example, a self-supporting film or comminuted particulate matter. A film of the composite material or particulates of the composite material may then be applied to another support or added to a composition (such as a coating composition) for its ultimate end-use. The end-use and final form of the composite material is not limited to those described herein.

Second Particles

The second particles are inorganic particles that are generated in situ as a minor component within the major component of the array and the matrix. In one embodiment, the inorganic particulate phase is a metal oxide. A metal oxide phase may be incorporated into the major component by using a precursor of the metal oxide phase dissolved in a solvent that swells the shells of the core-shell particles of the array or the matrix surrounding the unitary particles of the array. Examples of suitable precursors include: tetraethyl orthosilicate, tetramethyl orthosilicate, and titanium isopropoxide. The major component including the ordered array of organic polymeric first particles is contacted with the precursor solution so as to infuse the precursor component into the first component. The major component with the infused precursor is exposed to moisture, such as atmospheric moisture or by soaking in water, to hydrolyze the precursor component thereby forming hydroxyl-functional groups such as —Si—OH or —Ti—OH, followed by exposure to ambient conditions or an optional heating step to condense the hydrolyzed product to form a metal oxide phase in situ in the polymeric phase.

The hydrolysis and condensation reactions may be catalyzed by an acid or base. The metal oxide precursor that forms the metal oxide phase is derived from metals having a hydrolyzable leaving group that is soluble in the swelling solvent and is capable of forming an inorganic particulate phase by hydrolysis and condensation. Examples of suitable metals are electropositive metals that can replace the hydrogen of an acid and form bases with the hydroxyl radical. Preferred metals are silicon, titanium, aluminum and zirconium. Suitable precursors are $MX_3$ and $MX_4$, where M is the metal and X is halogen, alkoxy, aryloxy, carboxy or an $NR_2$ group in which R is hydrogen and/or alkyl and/or aryl. Also, other metals may be used particularly in combination with the preferred metals. Examples of such metals are boron, indium, tin, tantalum, lanthanum, iron, gold, copper, yttrium, germanium, barium and magnesium. The composite material of the present invention may possess properties heretofore not typical of CCAs. For example, infusion of iron-based inorganic particles into an array renders the array magnetic and may also impart a color to the composite material. Similarly, an array may be electrically conductive by infusion of conductive metal particles such as silver. Alternatively, an array may have anti-fouling properties when infused with copper or gold. Examples of precursors are tetraethyl orthosilicate, tetramethyl orthosilicate, alkoxides of metals such as titanium and zirconium in which the alkoxide group contains from 1 to 12 carbon atoms. These may include titanium tetraisopropoxide, zirconium tetra-n-butoxide and aluminum tri-sec-butoxide.

The solvents that are used in the method of the present invention are those that are capable of swelling the shells of the core-shell particles of the array or the matrix surrounding the unitary particles of the array and also capable of dissolving the precursor component of the inorganic particulate phase. Examples of suitable solvents include; alcohols, particularly those containing from 1 to 4 carbon atoms such as methanol, ethanol, ethyl acetate, methylethyl ketone and N-methyl pyrrolidone. Contacting the major component with the above-described solutions can be achieved by immersion of the major component in the solution. The major component may be quickly dipped or soaked for longer periods of time depending on the time needed to allow swelling and infusion of the precursor component into the first component. The time required can vary depending on the materials of the first components, the solvent, and the temperature of treatment. Typically, the solutions are maintained at a temperature of 0-100° C., and the immersion time is about one minute or more. Higher pressure may be advantageous to promote infusion but is not critical. The process is typically carried out at atmospheric pressure. Following the infusion of the precursor component, the infused major component is exposed to moisture either from the atmosphere or externally supplied. In one embodiment, the infused major component containing the precursor component is immersed in water, or more preferably, under acidic or basic pH, to catalyze the hydrolysis and condensation reactions thereby forming the inorganic particulate phase. Examples of suitable bases are inorganic bases such as ammonium hydroxide and organic bases such as amines. The size of the inorganic particles may vary between 1 micron and 1 nanometer. Basic conditions favor production of smaller particles such as those that are less than 1000 nanometers, typically less than 100 nanometers. Acidic condition for hydrolysis tends to favor larger sized particles or production of monolithic structures. For certain inorganic particles, acidic conditions may be desirable to create monolithic layers of inorganic material interspersed with the major component. Non-limiting examples of desirable monolithic materials include iron or iron-containing compounds to create a magnetic composite material and silver or silver-containing compounds, resulting in a conductive composite material.

When the precursor solution is applied to an array of core-shell first particles, the solvent of the precursor solution diffuses into the shells of the core-shell particles and causes the shells to swell. For arrays of unitary first particles, application of the precursor solution may cause the matrix surrounding the unitary particles to swell. Such swelling (of the particle shells or of the surrounding matrix) typically increases the distance between the center lines of the layers of first particles (core-shell or unitary) in the ordered periodic array. In this manner, the first particles may become somewhat elongated, as shown schematically in FIG. 2, wherein a longer dimension is aligned with the thickness of the array. It is believed that swelling of the first particles and/or surrounding matrix composition generally occurs between the layers of the first particles, thereby creating sites for infusion of the inorganic particulate phase. As a result, the infused array exhibits a multi-layered structure, which generally includes layers of predominantly organic polymeric particles (layers A) separated by layers of predominantly inorganic particles from the infused inorganic particulate phase (layers B) with the inorganic particulate phase possibly including some organic material such as from the matrix composition and/or the first particles. In this manner, infusion of the second particles results in "layers" in the ordered, periodic array of first particles held in the matrix material. For core-shell first particles having the second particles infused therein, the resulting multi-layered material generally exhibits a structure of composite particles (core-shell first particles with second particles infused therein) held in the matrix material. The resultant composite particles include both an organic portion (of the original first particles) and an inorganic portion (of the infused second particles). As shown, schematically in FIGS. 1 and 2, the inorganic portion comprises a minority of the composite particles.

The treated array is recovered and solvent, water, and any unreacted starting materials are removed by evaporation through air-drying at ambient temperature or heating at elevated temperature such as about 60° C. or above, but below the decomposition temperature of the polymers of the array. Such heating normally removes unwanted materials and may also facilitate the condensation reaction. The time for heating is typically about 1 minute or more depending on the temperature and vapor pressure of the solvent. Optionally, heating can be conducted under vacuum.

In one embodiment, the composite material of the present invention is non-gelatinous and substantially solid. By non-gelatinous, it is meant that the composite material does not contain a fluidizing material, such as water, and is not a hydrogel, nor produced from a hydrogel. In certain embodiments, the composite material of the present invention substantially only includes the first and second particles and the matrix with some possible residual solvent and, thus, is substantially solid. The volumetric ratio of the particles to the matrix in the composite material is typically about 25:75 to about 80:20.

One feature of the present invention is a change in intensity (increase or decrease) of reflected radiation from an array of the composite particles as compared to an array of particles not having the inorganic particulate phase. The change of intensity of reflected radiation is believed to be due to a shift in difference in refractive index between the composite particles and the matrix as compared to the refractive index difference between an array of organic particles held in a matrix not having the second particles infused therein.

Substrate

The substrate may be a flexible material, such as metal sheet or foil (e.g. aluminum foil), paper or a film (or sheet) of polyester or polyethylene terephthalate (PET), or an inflexible material, such as glass or plastic. By "flexible" it is meant that the substrate can undergo mechanical stresses, such as bending, stretching, compression and the like, without significant irreversible change. One suitable substrate is a microporous sheet. Some examples of microporous sheets are disclosed in U.S. Pat. Nos. 4,833,172; 4,861,644; and 6,114,023, which are incorporated herein by reference. Commercially available microporous sheets are sold under the designation Teslin® by PPG Industries, Inc. Other suitable flexible substrates include natural leather, synthetic leather, finished natural leather, finished synthetic leather, suede, vinyl nylon, ethylene vinyl acetate foam (EVA foam), thermoplastic urethane (TPU), fluid-filled bladders, polyolefins and polyolefin blends, polyvinyl acetate and copolymers, polyvinyl chloride and copolymers, urethane elastomers, synthetic textiles and natural textiles.

In certain embodiments, the flexible substrates are compressible substrates. "Compressible substrate" and like terms refer to substrates capable of undergoing a compressive deformation and returning to substantially the same shape once the compressive deformation has ceased. The term "compressive deformation" means a mechanical stress that reduces the volume at least temporarily of a substrate in at least one direction. As noted above, the composite material of the present invention may be applied to a compressible substrate. "Compressible substrate" and like terms refer to a substrate capable of undergoing a compressive deformation and returning to substantially the same shape once the compressive deformation has ceased. The term "compressive deformation" and like terms mean a mechanical stress that reduces the volume at least temporarily of a substrate in at least one direction. A compressible substrate is one, for example, that has a compressive strain of 50% or greater, such as 70%, 75% or 80% or greater. Particular examples of compressible substrates include those comprising foam and polymeric bladders filled with air, liquid, and/or plasma. "Foam" can be a polymeric or natural material comprising open cell foam and/or closed cell foam. "Open cell foam" means that the foam comprises a plurality of interconnected air chambers; "closed cell foam" means that the foam comprises discrete closed pores. Example foams include, but are not limited to, polystyrene foams, polyvinyl acetate and/or copolymers, polyvinyl chloride and/or copolymers, poly (meth)acrylimide foams, polyvinylchloride foams, polyurethane foams, thermoplastic urethane foams, and polyolefinic foams and polyolefin blends. Polyolefinic foams include, but are not limited to, polypropylene foams, polyethylene foams and ethylene vinyl acetate ("EVA") foams. "EVA foam" can comprise open cell foam and/or closed cell foam. EVA foam can include flat sheets or slabs or molded EVA foams, such as shoe midsoles. Different types of EVA foam can have different types of surface porosity. Molded EVA foam can comprise a dense surface or "skin", whereas flat sheets or slabs can exhibit a porous surface.

Polyurethane substrates according to the present invention include aromatic, aliphatic and hybrid (hybrid examples are silicone polyether or polyester urethane and silicone carbonate urethane) polyester or polyether based thermoplastic urethane. By "plastic" is meant any of the common thermoplastic or thermosetting synthetic materials, including thermoplastic olefins ("TPO") such as polyethylene and polypropylene and blends thereof, thermoplastic urethane, polycarbonate, sheet molding compound, reaction-injection molding compound, acrylonitrile-based materials, nylon, and the like. A particular plastic is TPO that comprises polypropylene and EPDM (ethylene propylene diene monomer).

The composite material may be applied to an article in various ways. In one embodiment, the composite material is produced on a substrate and is then removed from the substrate and comminuted into particulate form, such as in the form of flakes. The comminuted composite material may be incorporated as an additive in a coating composition for applying to an article. It may be beneficial to minimize the haze in a coating composition containing the comminuted composite material. Reduced haze may be achieved by reducing the difference in refractive index between the matrix and particles of the composite material. However, a reduction in the refractive index difference generally reduces the intensity of refracted radiation. Therefore, when minimal haze is desired and the refractive index difference is reduced, intensity may be maintained by increasing the thickness of the composite material, i.e., by increasing the quantity of layers of particles in the array, as compared to material in which the refractive indices of the matrix and particles are more distinct from each other.

In one embodiment, the coating composition comprises a "hard coat", such as an alkoxide. The alkoxide can be further mixed and/or reacted with other compounds and/or polymers known in the art. Particularly suitable are compositions comprising siloxanes formed from at least partially hydrolyzing an organoalkoxysilane, such as one within the formula above. Examples of suitable alkoxide-containing compounds and methods for making them are described in U.S. Pat. Nos. 6,355,189; 6,264,869; 6,469,119; 6,180,248; 5,916,686; 5,401,579; 4,799,963; 5,344,712; 4,731,264; 4,753,827; 4,754,012; 4,814,017; 5,115,023; 5,035,745; 5,231,156; 5,199,979; and 6,106,605, which are incorporated by reference herein.

In certain embodiments, the alkoxide comprises a combination of a glycidoxy[$(C_1-C_3)$alkyl]tri($C_1-C_4$)alkoxysilane monomer and a tetra($C_1-C_6$)alkoxysilane monomer. Glycidoxy[$(C_1-C_3)$alkyl]tri($C_1-C_4$)alkoxysilane monomers suitable for use in the coating compositions of the present invention include glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, hydrolysates thereof, and/or mixtures of such silane monomers. Suitable tetra($C_1-C_6$)alkoxysilanes that may be used in combination with the glycidoxy[$(C_1-C_3)$alkyl]tri($C_1-C_4$) alkoxysilane in the coating compositions of the present invention include, for example, materials such as tetramethoxysilane, tetraethoxysilane, tetrapropoxysilane, tetrabutoxysilane, tetrapentyloxysilane, tetrahexyloxysilane and mixtures thereof.

In certain embodiments, the glycidoxy[$(C_1-C_3)$alkyl]tri($C_1-C_4$)alkoxysilane and tetra($C_1-C_6$)alkoxysilane monomers used in the coating compositions of the present invention are present in a weight ratio of glycidoxy [$(C_1-C_3)$alkyl]tri($C_1-C_4$)alkoxysilane to tetra($C_1-C_6$)alkoxysilane of from 0.5:1 to 100:1, such as 0.75:1 to 50:1 and, in some cases, from 1:1 to 5:1. In certain embodiments, the alkoxide is at least partially hydrolyzed before it is combined with other components of the coating composition, such as polymer-enclosed color-imparting particles. Such a hydrolysis reaction is described in U.S. Pat. No. 6,355,189 at col. 3, lines 7 to 28, the cited portion of which is incorporated by reference herein. In certain embodiments, water is provided in an amount necessary for the hydrolysis of the hydrolyzable alkoxide(s). For example, in certain embodiments, water is present in an amount of at least 1.5 moles of water per mole of hydrolyzable alkoxide. In certain embodiments, atmospheric moisture, if sufficient, can be adequate.

In certain embodiments, a catalyst is provided to catalyze the hydrolysis and condensation reaction. In certain embodiments, the catalyst is an acidic material and/or a material, different from the acidic material, which generates an acid upon exposure to actinic radiation. In certain embodiments, the acidic material is chosen from an organic acid, inorganic acid or mixture thereof. Non-limiting examples of such materials include acetic, formic, glutaric, maleic, nitric, hydrochloric, phosphoric, hydrofluoric, sulfuric acid or mixtures thereof.

Any material that generates an acid on exposure to actinic radiation can be used as a hydrolysis and condensation catalyst in the coating compositions of the present invention, such as a Lewis acid and/or a Bronsted acid. Non-limiting examples of acid generating compounds include onium salts and iodosyl salts, aromatic diazonium salts, metallocenium salts, o-nitrobenzaldehyde, the polyoxymethylene polymers described in U.S. Pat. No. 3,991,033, the o-nitrocarbinol esters described in U.S. Pat. No. 3,849,137, the o-nitrophenyl acetals, their polyesters and end-capped derivatives described in U.S. Pat. No. 4,086,210, sulphonate esters or aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253. Examples of these radiation activated acid catalysts are also disclosed in U.S. Pat. No. 5,451,345.

In certain embodiments, the acid generating compound is a cationic photoinitiator, such as an onium salt. Non-limiting examples of such materials include diaryliodonium salts and triarylsulfonium salts, which are commercially available as SarCat® CD-1012 and CD-1011 from Sartomer Company. Other suitable onium salts are described in U.S. Pat. No. 5,639,802, column 8, line 59 to column 10, line 46. Examples of such onium salts include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy]phenyl]phenyl iodonium hexafluoroantimonate and mixtures thereof.

The amount of catalyst used in the coating compositions of the present invention can vary widely and depend on the particular materials used. Only the amount required to catalyze and/or to initiate the hydrolysis and condensation reaction is required, e.g., a catalyzing amount. In certain embodiments, the acidic material and/or acid generating material can be used in an amount from 0.01 to 5% by weight, based on the total weight of the composition.

The composite material produced according to the invention may be used in marking devices, including documents of value, articles of manufacture and their packaging and credentials documents. Examples of documents of value include currency, credit cards, compliance certificates, collectors' items and trading cards, deeds, titles or registrations (e.g., automotive), compliance decals, tickets (e.g., travel, events or parking), tax stamps, coins, postage stamps, checks and money orders, stationary, lottery tickets, chips and/or tokens, controlled items (e.g., evidence), key cards, keys, tracing and tracking items and as a portion of barcodes. Articles of manufacture or packaging of articles of manufacture may include aircraft parts, automotive parts such as vehicle identification numbers, pharmaceutical products and personal care products, recorded media, clothing and footwear, electronic devices, batteries, ophthalmic devices, alcohol, food items, printing inks and printing consumables, writing implements, luxury items such as luggage and handbags, sporting goods, software and software packaging, tamper seals, artwork (including original works of art), construction materials, munitions, toys, fuel, industrial equipment, biological materials and living goods, jewelry, books, antiques, safety items (e.g., fire extinguishers and filtration devices), carpets and other furnishings, chemicals, medical devices, paint and coatings and windows and transparencies. Examples of credentials which may bear the composite material produced according to the present invention include drivers' licenses, identification cards (government, corporate and educational) passports, visas, marriage certificates, hospital bracelets and diplomas. These examples are not meant to be limiting and are only a sampling of devices that may bear the composite material of the present invention. Such uses are not meant to be limiting.

In addition, the composite material may be produced in the form of a film or sheet, which is then applied to an article such as via an adhesive or the like.

Alternatively, the article itself may serve as a substrate by applying the array of particles directly to the housing of the article such as the housing of electronic devices or directly to goods such as athletic equipment, accessories, optical lenses, optical frames, clothing, including shoes and the like.

The composite material of the present invention may be used to authenticate an article, such as to authenticate a document or device or to identify the source of a manufactured product. A document, such as a security card, that bears the composite material of the present invention would be considered to be authentic if the article bearing the composite material exhibits the properties thereof, such as diffraction of certain wavelengths of radiation at a particular intensity level alone or in combination with additional properties such as electromagnetic properties (e.g., being magnetic or conductive). A "security card" includes documents or devices that authenticate the identity of the bearer thereof or permit access to a facility, such as in the form of a badge. The security card may identify the bearer of the card (e.g., a photo-identification card or a passport) or may function as a document or device that indicates that the bearer thereof is to be permitted access to a secure facility. For example, a security card that appears to be authentic may be tested for having properties of diffracting radiation and electromagnetism. A counterfeit security card would fail to exhibit these properties. Likewise, consumers of an item (such as a pharmaceutical product) provided in packaging bearing a sensor of the present invention can test the packaging for its authenticity by testing its diffractive properties and electromagnetic properties. Packaging which does not respond appropriately would be considered to be counterfeit, while packaging that does exhibit the properties would be considered to be authentic. Other consumer goods may include the composite materials of the present invention, such as on the housing of a manufactured product (e.g., electronic devices) or on the surface of an article of clothing (e.g., shoes).

The composite material may further be at least partially covered with a coating composition in a multi-layered structure. In one embodiment, the composite material is coated with the above-described "hard coat" coating composition. In another embodiment, the composite material is coated with an anti-reflective coating, such as in a multi-layered anti-reflective stack. The anti-reflective coating may be formed of a dielectric material; e.g., metal oxides, such as $Zn_2SnO_4$, $In_2SO_4$, $SnO_2$, $TiO_2$, $In_2O_3$, $ZnO$, $Si_3N_4$ and/or $Bi_2O_3$ deposited by sputtering.

The following examples are presented to demonstrate the general principles of the invention. The invention should not be considered as limited to the specific examples presented. All parts are by weight unless otherwise indicated.

EXAMPLES

Example 1

A dispersion of polystyrene-divinylbenzene core/styrene-methyl methacrylate-ethylene glycol dimethacrylate-divinylbenzene shell particles in water was prepared via the following procedure. 3.0 Grams (g) of sodium bicarbonate from Aldrich Chemical Company was mixed with 4100 g deionized water and added to a 12-liter flask equipped with a thermocouple, heating mantle, stirrer, reflux condenser and nitrogen inlet. The mixture was sparged with nitrogen for 40 minutes with stirring and then blanketed with nitrogen. Surfactant Aerosol MA80-I (19 g, from Cytec Industries, Inc., 2.5 g Styrene sulfonic acid sodium salt hydrate and 8.0 g Brij®35 solution both available from Aldrich Chemical Company, Inc., in 410 g deionized water) was added to the mixture with stirring followed by a 48 g deionized water rinse. This was followed by the addition of 8.0 g poly(ethylene glycol) methyl ether methacrylate from Aldrich Chemical Company, Inc. The mixture was heated to approximately 50° C. using a heating mantle. Styrene monomer (720 g), and divinylbenzene (20.0 g) available from Aldrich Chemical Company, Inc., was added with stirring. The mixture was heated to 60° C. Sodium persulfate from Aldrich Chemical Company, Inc. (12.0 g in 144 g deionized water) was added to the mixture with stirring. The temperature of the mixture was held constant for 40 minutes. Under agitation, and in a separate container, 200.0 g of divinylbenzene, 1.0 g Brij®35, 100.0 g styrene, and 1.0 g of styrene sulfonic acid sodium salt hydrate was mixed with 300.0 g deionized water and heated. To this mixture, deionized water (1000 g), styrene sulfonic acid sodium salt hydrate (4.5 g), Brij®35 (6.0 g), sodium persulfate (3.0 g), styrene (150.0 g), methyl methacrylate (200.0 g), ethylene glycol dimethacrylate (35.0 g) and all available from Aldrich Chemical Company, Inc., was added and stirred at 500 rpm for 40 minutes. This was then added to the flask and followed with a 100.0 g rinse of deionized water. The temperature was held at approximately 60° C. for 4.0 hours. The resulting polymer dispersion was filtered through a five-micron filter bag. The polymer dispersion was then ultrafiltered using a 4-inch ultrafiltration housing with a 2.41-inch polyvinylidine fluoride membrane, both from PTI Advanced Filtration, Inc., Oxnard, Calif., and was pumped using a peristaltic pump at a flow rate of approximately 170 ml per second. Deionized water (3000 g) was added to the dispersion after 3000 g of ultrafiltrate had been removed. This exchange was repeated several times until 8686.0 g of ultrafiltrate was replaced with 8683.0 g of deionized water. Additional ultrafiltrate was then removed until the solids content of the mixture was 40.7% by weight. The material was applied via a slot-die coater from Frontier industrial Technology, Inc., Towanda, Pa., to a polyethylene terephthalate substrate and dried at 180° F. for 30 seconds to a porous dry thickness of approximately 10 microns.

The interstitial spaces of the array were filled with a mixture of 3% diphenyl (2,4,6-trimethylbenzoyl) phosphine oxide/2-hydroxy-2-methyl-propiophenone, 50/50 blend from Sigma-Aldrich Corporation, Milwaukee, Wis., 97% of the hydrophilic monomer ethoxylated (20) trimethylol propane triacrylate from Sartomer Company, Inc., Exton, Pa. The resulting film diffracted visible light at 474 nm and 25.3% reflectance.

Example 2

A solution comprising 75% by volume of tetramethylorthosilicate (TMOS) (available from Gelest, Inc. Morrisville, Pa.) and 25% by volume of methanol (HPLC grade from Honeywell Burdick and Jackson) was prepared in a beaker. A portion of the film from Example 1 was placed into the beaker containing the TMOS/methanol solution and soaked for approximately 1 minute. The film was then removed from the TMOS/methanol solution and placed into a 15% solution of $NH_4OH$ in water (30% $NH_4OH$ available from Sigma-Aldrich Corporation, Milwaukee, Wis.) for approximately 30 seconds. The film was removed from the basic solution and soaked in deionized water for 2 minutes, whereupon it was removed and dried. The resulting film diffracted visible light at 483 nm and 29.2% reflectance.

Comparative Example 3

A portion of the film prepared in Example 1 was treated with a mixture of 3% diphenyl (2,4,6-trimethylbenzoyl) phosphine oxide/2-hydroxy-2-methyl-propiophenone, 50/50 blend from Sigma-Aldrich Corporation, Milwaukee, Wis., 48.5% 1,4-butanediol diacrylate and 48.5% ethoxylated (20) trimethylol propane triacrylate both available from Sartomer Company, Inc., Exton, Pa. This was followed by UV curing. The resulting film diffracted light at 500 nm and 32.1% reflectance.

Comparative Example 4

This example was prepared in the same manner as Comparative Example 3 except that a portion of the film produced in Example 2 was used. The resulting film diffracted light at 511 nm and 38.3% reflectance.
The results for the Examples are listed in Table 1.

TABLE 1

| Example | Description | Wavelength (nm) | % Reflectance |
|---|---|---|---|
| 1 | Control | 474 | 25.3 |
| 2 | Silica infused | 483 | 29.2 |
| 3 (Comparative) | Example 1 treated with acrylate | 500 | 32.1 |
| 4 (Comparative) | Example 2 treated with acrylate | 511 | 38.3 |

Figure 3:
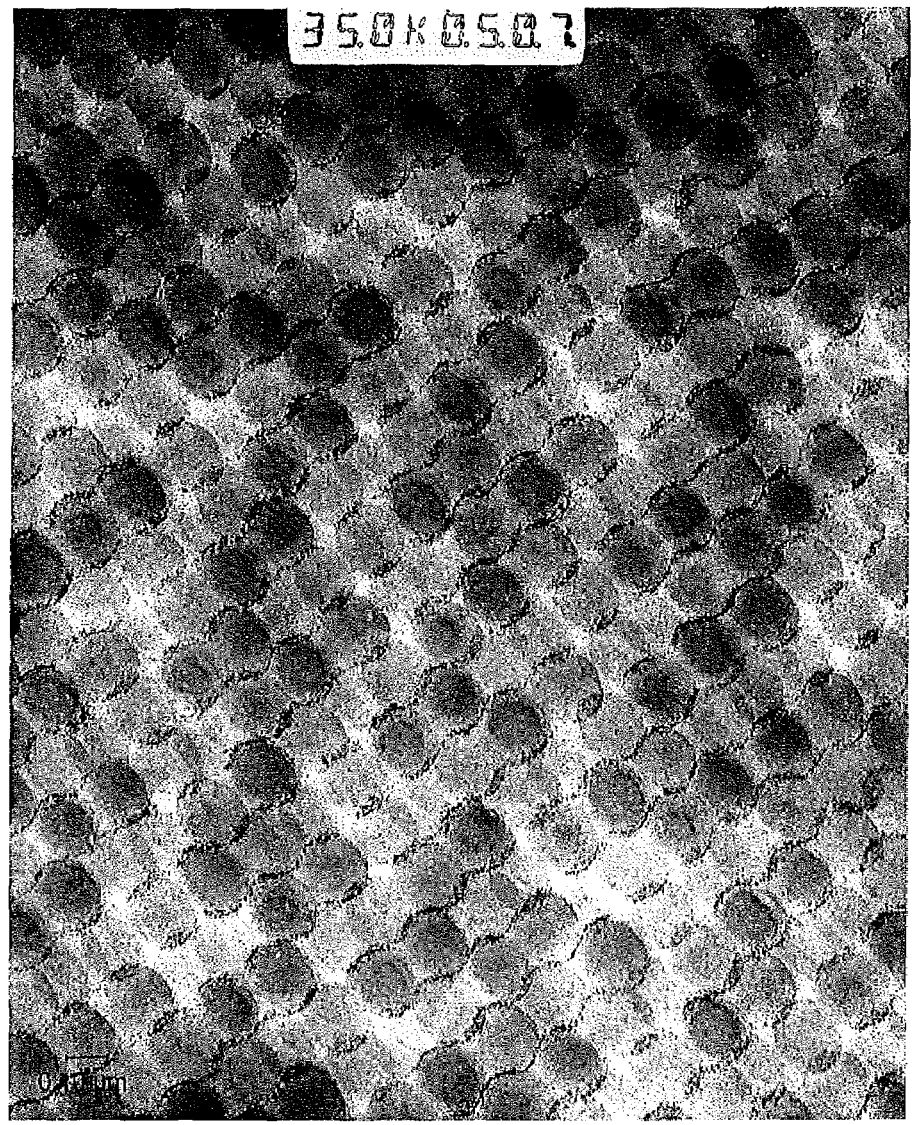
FIG. 3 is a transmission electron micrograph of a multi-layered composite material produced according to the present invention.

A transmission electron micrograph of the material in Example 2 is reproduced in FIG. 3. The infused silica particles are visible between layers of the organic particles. A comparison of the data from Examples 1 and 2 demonstrates that the increased percent reflectance and red shift of reflected radiation are due to the presence of the infused silica. Additionally, swelling of the organic particles of Examples 1 and 2 is achievable by adding acrylate monomer followed by curing, as evidenced by the further wavelength shift and reflectance increase of Comparative Examples 3 and 4.

While the preferred embodiments of the present invention are described above, obvious modifications and alterations of the present invention may be made without departing from the spirit and scope of the present invention. The scope of the present invention is defined in the appended claims and equivalents thereto.

The invention claimed is:

1. A multi-layered composite material comprising:
a radiation diffractive ordered periodic array comprising first particles held in a matrix composition, said first particles each comprising a core surrounded by a shell having a composition different from said core; and second particles received within said shells of said first particles and arranged in spaced apart layers comprising said second particles, a portion of said matrix composition, and a portion of said shells within the periodic array of first particles, and wherein said first particles are different from said second particles, and wherein the composite material is prepared by a process comprising:
providing a periodic array of layered first particles held in a matrix, wherein the first particles comprise a core surrounded by a shell having a composition different from the core;
applying a precursor solution to the periodic array, said precursor solution comprising a swellable solvent having a precursor material dissolved therein
and subsequently swelling the shells of the first particles, such that the solvent diffuses into and infuses said second particles into the shells, resulting in the formation of said spaced apart layers.

2. The multi-layered composite material of claim 1 wherein said first particles comprise organic polymer particles and said second particles comprise inorganic particles.

3. The multi-layered composite material of claim 2 wherein said organic polymer particles comprise polystyrene, an acrylic polymer, polyurethane, an alkyd polymer, a polyester, a siloxane-containing polymer, a polysulfide and/or an epoxy-containing polymer.

4. The multi-layered composite material of claim 2 wherein said inorganic particles comprise a metal.

5. The multi-layered composite material of claim 4 wherein said metal is a metal oxide.

6. The multi-layered composite material of claim 5 wherein said metal is silicon, titanium, zirconium, aluminum, magnesium, iron and/or silver.

7. The multi-layered composite material of claim 1 wherein said spaced apart layers of said inorganic portions are positioned at opposing sides of said organic portions of said composite particles.

8. The multi-layered composite material of claim 1 wherein said composite particles comprise a major polymeric organic portion and a minor inorganic portion.

9. The multi-layered composite material of claim 1 wherein said organic portion comprises polystyrene, an acrylic polymer, polyurethane, an alkyd polymer, a polyester, a siloxane-containing polymer, a polysulfide and/or an epoxy-containing polymer.

10. The multi-layered composite material of claim 1 wherein said inorganic portion comprises a metal.

11. The multi-layered composite material of claim 10 wherein said metal is silicon, titanium, zirconium, aluminum, magnesium, iron and/or silver.

12. The multilayered composite material of claim 1, wherein the second particles are a precursor of an inorganic particle and the multilayered composite material is exposed to moisture to hydrolyze the precursor.

13. The multilayered composite material of claim 12, wherein the multilayered composite material is treated with an acrylate monomer.

14. A method of producing the multi-layered composite material of claim 1 comprising:

providing a major component comprising a periodic array of a plurality of layers of organic polymer particles held in a matrix, the organic polymer particles comprising a core surrounded by a shell having a composition different from the core; and forming inorganic particles in situ in the shells in spaced apart layers to produce composite particles each comprising a polymeric organic portion and an inorganic portion, wherein said inorganic portions are provided within the composite particles adjacent a neighboring layer of composite particles.

15. The method of claim 14 wherein forming the inorganic particles in situ comprises swelling at least a portion of the shells with a precursor component to the inorganic particles and adding a component reactive to the shells whereby the precursor component forms the inorganic particles.

16. The method of claim 15 wherein the inorganic particles comprise a metal.

17. The method of claim 15 wherein the precursor component comprises an alkoxy silane and the inorganic particles comprise silica.

18. The method of claim 17 wherein the organic polymer particles comprise polystyrene, an acrylic polymer, polyurethane, an alkyd polymer, polyester, a siloxane-containing polymer, a polysulfide and/or an epoxy-containing polymer.

* * * * *